June 25, 1968 J. H. STRATHMAN ET AL 3,390,302

DISPLAY STABILIZER

Filed Oct. 23, 1965 2 Sheets-Sheet 1

INVENTORS
JOHN H. STRATHMAN
JAMES R. PETTIT

BY Q. C. Smith
ATTORNEY

June 25, 1968 J. H. STRATHMAN ET AL 3,390,302

DISPLAY STABILIZER

Filed Oct. 23, 1965 2 Sheets-Sheet 2

INVENTORS
JOHN H. STRATHMAN
JAMES R. PETTIT
BY A. C. Smith
ATTORNEY

United States Patent Office 3,390,302

Patented June 25, 1968

3,390,302
DISPLAY STABILIZER

John H. Strathman and James R. Pettit, Colorado Springs, Colo., assignors to Hewlett-Packard Company, Palo Alto, Calif., a corporation of California Filed Oct. 23, 1965, Ser. No. 503,305
3 Claims. (Cl. 315—25)

ABSTRACT OF THE DISCLOSURE

A sequence generator is used in an oscilloscope to establish stabilization periods during retrace. A reference signal is applied during these periods to the input of the vertical deflection amplifier and the output of the amplifier is simultaneously sampled for any error. The error signals is then stored and applied as a correction signal to the amplifier input during the successive sweep periods, thus stabilizing the base level of the oscilloscope.

This invention relates to a stabilizing circuit for signal display apparatus such as oscilloscopes and has for an object the provision of a circuit which stabilizes the zero reference or base line of the signal display against drift during periods between successive signal displays. A circuit of this type thus eliminates the need for frequent zero setting of amplifiers and circuits coupled to the display device when displaying signals having D.C. components.

In accordance with the illustrated embodiment of the present invention the signal amplifier coupled to the cathode ray display tube is stabilized against drift during the sweep retrace time. A feedback circuit operative during the retrace time removes applied signals from the signal amplifier and samples its output with the input grounded to produce an error-correcting signal which provides zero correction during a successive sweep period.

Other and incidental objects of the present invention will be apparent from a reading of this specification and an inspection of the accompanying drawing in which.

Figure 1:
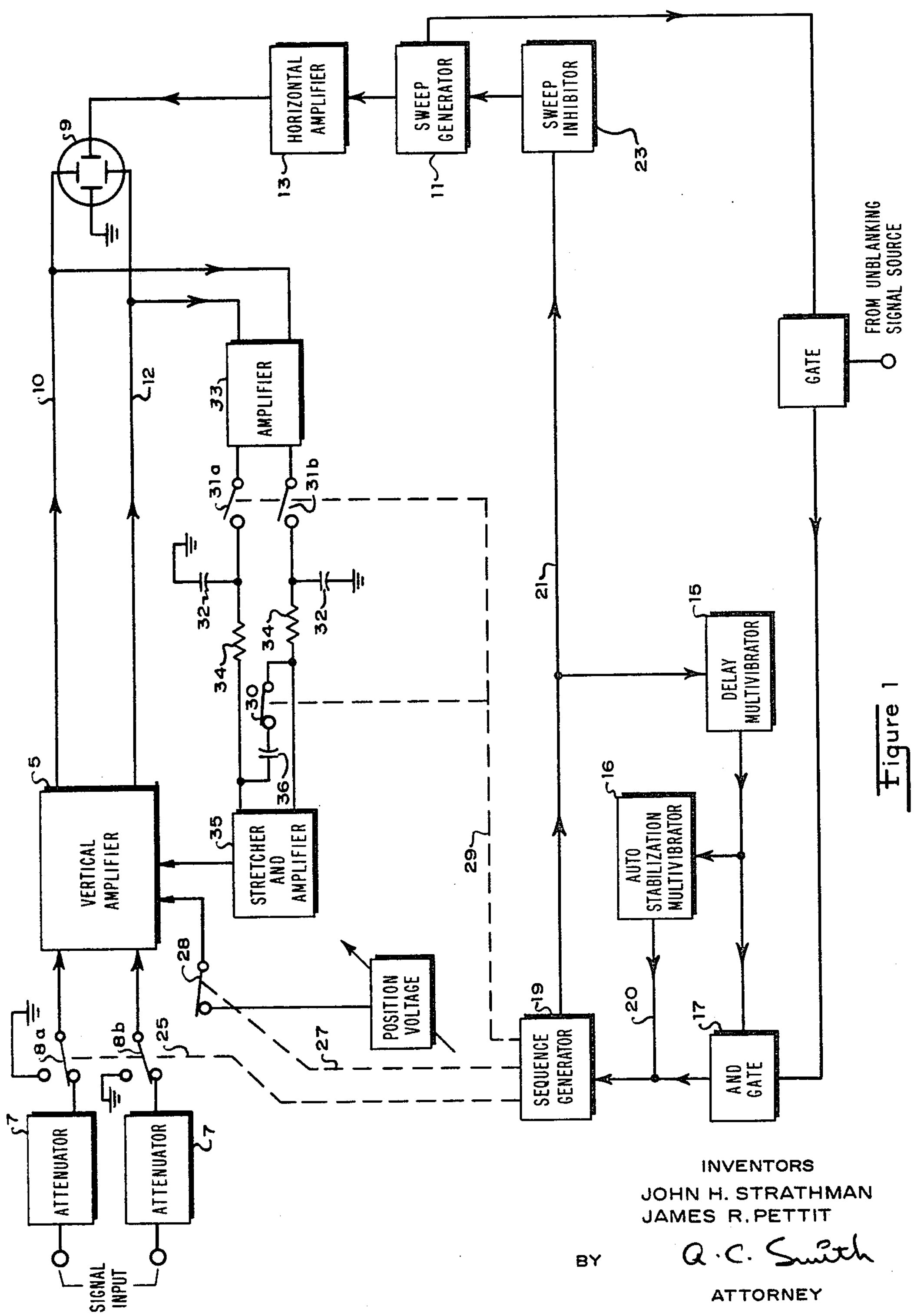
FIGURE 1 is a schematic diagram of the circuit of the present invention.
Figure 2:
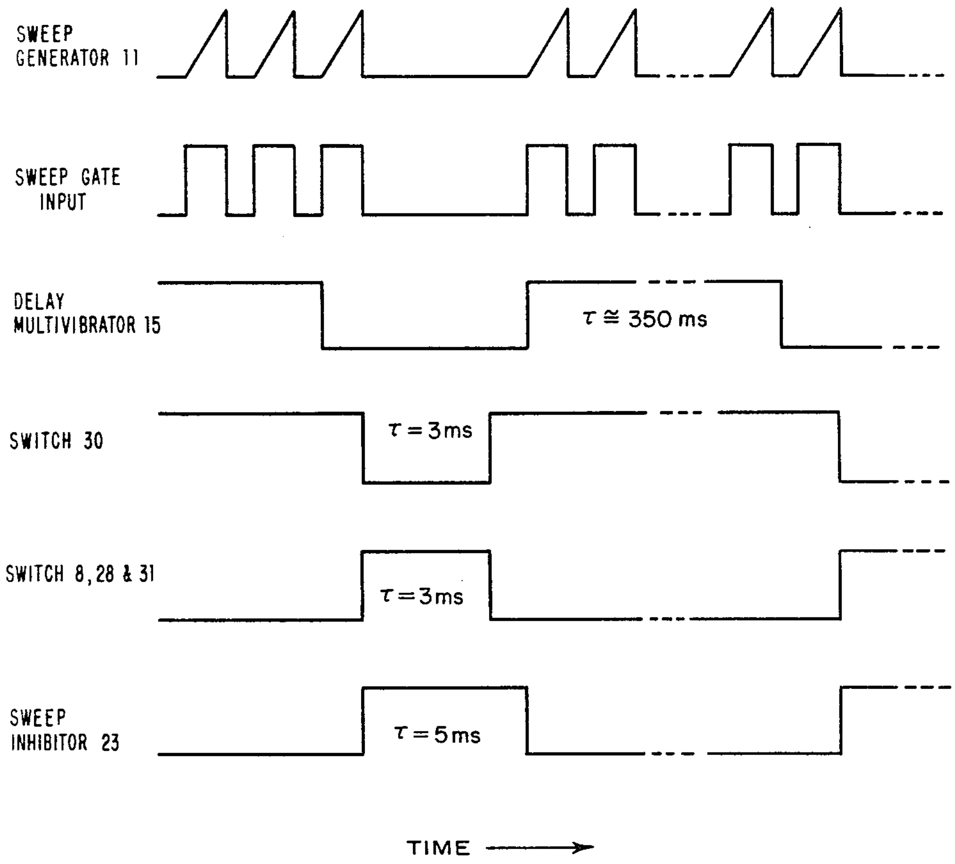
FIGURE 2 is a graph showing various waveforms in the circuit of FIGURE 1.

Referring to FIGURES 1 and 2, vertical amplifier 5 receives the input signal through input attenuators 7 and switches 8*a* and 8*b* and applies a deflection signal to the vertical deflection system of cathode ray display tube 9. At the same time, sweep generator 11 applies a deflection signal through horizontal amplifier 13 to the horizontal deflection system of tube 9. Monostable or delay multivibrator 15 is triggered at the start of a stabilization cycle and resets after a predetermined time, say about 350 milliseconds, and applies a signal to AND gate 17 at the reset time after a selected number of recurrences of the sweep signals from generator 11. A sweep gate input signal which is generated typically from the unblanking signal source for the cathode ray display tube in coincidence with the generated sweep is applied to gate 17 which thus produces a gate output at the end of the sweep gate which occurs during the time multivibrator 15 is in the reset condition. This gate output triggers sequence generator 19 to produce a plurality of outputs. Sequence generator 19 may also be triggered by the auto stabilizing multivibrator 16 through line 20 while multivibrator 15 is in the reset condition. This is desirable at very slow sweep speeds and eliminates dependence upon sweep gate input signals which recur at a very slow sweep repetition rate.

The output on line 21 actuates sweep inhibit circuit 23 to prevent the formation of a sweep signal from generator 11, thereby preventing the display of switching transients which might otherwise appear at faster sweep speeds where the time between sweeps is not sufficient to complete the stabilization cycle. Output 25 of sequence generator 19 sets switches 8*a* and 8*b* to the alternate or ground position and output 27 opens switch 28 to remove any vertical positioning voltage from the input of vertical amplifier 5. At the same time, output 29 of generator 19 opens switch 30 and closes switches 31*a* and 31*b* momentarily to sample the amplified signal appearing on output lines 10, 12 of amplifier 5. Any signal appearing on output lines 10, 12 with the input of vertical amplifier 5 grounded represents drift signal which when amplified by amplifier 33 and sampled by switch 31, produces a charge on the storage capacitors 32 in the input circuit of stretcher and amplifier 35. This stored charge produces a substantially constant voltage at the output of stretcher and amplifier 35 which is applied to the input of amplifier 5 during the next sweep cycle to provide the necessary zero offset correcting signal. The outputs of sequence generator 19 terminate after preselected times to close switches 8*a* and 8*b*, 28 and 30, open switches 31*a* and *b* were closed is transferred slowly through resistors 34 to the capacitor 36 with a time constant that is long compared with the time between stabilization cycles. This prevents the stabilization circuit from responding to peaks of low frequency noise which would cause a sudden shift of the displayed trace at the end of the stabilization cycle. This is desirable in order to average the correction for zero shift or drift which occurs partly as random noise and which would otherwise cause a sudden shift of the displayed trace following the end of the stabilization cycle during which the circuit responds to peaks of low frequency noise. Averaging of the correction signal during the stabilization cycle causes an unstable mode of operation which is avoided by the use of capacitor 36 and switch 30 in the manner as previously described.

At the end of a stabilization cycle, the vertical positioning voltage is restored and input signal is again displayed normally on tube 9 during the period that recurring sweep signals from sweep generator 11 are applied to the horizontal deflection system of tube 9. At the end of the preselected time, multivibrator 15 resets and again applies a signal to AND gate 17 to render the circuit operative on a sweep gate input signal in a manner as previously described. This updates the stretcher output voltage to provide the necessary zero offset correcting signal during successive recurrences of the sweep signal.

Therefore, the circuit of the present invention stabilizes the base line of signal display apparatus by producing a zero-offset correcting signal during periods between successive signal displays.

We claim:

1. In an oscilloscope including a cathode ray display tube having horizontal and vertical deflection inputs, display stabilizing apparatus comprising:
   - a source of recurring sweep signal connected to the horizontal deflection input;
   - circuit means having an output coupled to said vertical deflection input for applying thereto a signal related to an applied signal to be displayed on said tube;
   - means operative during an interval following a period of a selected number of recurrences of said sweep signal for establishing a reference potential at the input of said circuit means;
   - a circuit connected to the output of said circuit means and operative during said interval for producing a correction signal related to the amplitude of the signal appearing on the output of said circuit means; and means connected to said circuit means for applying said correction signal thereto during a successive recurrence of said sweep signal.

2. Display stabilizing apparatus comprising:

a signal display device having two coordinate deflection systems and a signal input for each deflection system;

a source of recurring sweep signal operatively connected to the signal input of one of said deflection systems;

circuit means connected to the signal input of the other of said deflection systems for applying thereto a signal related to an applied signal to be displayed by said device;

a circuit to produce a correction signal related to the signal on said signal input of said other coordinate system during an interval following a selected number of recurrences of said sweep signal;

means operative during said interval for establishing a reference potential on the input of the circuit means; and means connected to said circuit means for applying said correction signal thereto during a successive period of a selected number of recurrences of said sweep signal.

3. In an oscilloscope including a cathode ray display tube having horizontal and vertical deflection electrodes, display stabilizing apparatus comprising:

a source of recurring sweep signal connected to the horizontal deflection electrodes;

an amplifier having a pair of outputs coupled to said vertical deflection electrodes for applying thereto a signal related to an applied signal to be displayed by said tube;

means operative during an interval following a period of a selected number of recurrences of said sweep signal for establishing a reference potential at an input of said circuit means;

a capacitor for each output of said amplifier;

means connected to the outputs of said amplifier and to said capacitors and operative during said interval for storing in each capacitor an amount of charge related to the amplitude of a signal appearing on a corresponding output of said amplifier;

another capacitor and means connecting said other capacitor to said first-named capacitors after said interval for receiving the charge stored on said first-named capacitors;

means connected to said other capacitor and to said amplifier for applying thereto a correction signal related to the charge on said other capacitor during a successive recurrence of said sweep signal.

References Cited

UNITED STATES PATENTS 3,242,489 3/1966 Leyde.

RODNEY D. BENNETT, *Primary Examiner.*

T. H. TUBBESING, *Assistant Examiner.*

UNITED STATES PATENT OFFICE

CERTIFICATE OF CORRECTION

Patent No. 3,390,302 June 25, 1968

John H. Strathman et al.

It is certified that error appears in the above identified patent and that said Letters Patent are hereby corrected as shown below:

Column 2, line 22, after "31a and b" insert -- and enable sweep generator 11 for initiating another sweep signal and for triggering multivibrator 15. The charge stored on capacitors 32 during the time switches 31a and b --.

Signed and sealed this 11th day of November 1969.

(SEAL)
Attest:

Edward M. Fletcher, Jr.
Attesting Officer

WILLIAM E. SCHUYLER, JR.
Commissioner of Patents